(12) United States Patent
Geisen (10) Patent No.: US 11,583,956 B2
(45) Date of Patent: Feb. 21, 2023

(54) METHOD FOR THE ADDITIVE CONSTRUCTION OF A STRUCTURE AND COMPUTER PROGRAM PRODUCT

(71) Applicant: Siemens Energy Global GmbH & Co. KG, Munich (DE)

(72) Inventor: Ole Geisen, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 248 days.

(21) Appl. No.: 16/766,721

(22) PCT Filed: Nov. 19, 2018

(86) PCT No.: PCT/EP2018/081736
§ 371 (c)(1),
(2) Date: May 25, 2020

(87) PCT Pub. No.: WO2019/120810
PCT Pub. Date: Jun. 27, 2019

(65) Prior Publication Data
US 2020/0391324 A1  Dec. 17, 2020

(30) Foreign Application Priority Data

Dec. 19, 2017 (DE) ...................... 10 2017 223 223.4

(51) Int. Cl.
*B33Y 10/00* (2015.01)
*B23K 26/03* (2006.01)
(Continued)

(52) U.S. Cl.
CPC .......... *B23K 26/342* (2015.10); *B23K 26/032* (2013.01); *B23K 26/08* (2013.01);
(Continued)

(58) Field of Classification Search
CPC .... B23K 26/342; B23K 26/032; B23K 26/08; B23K 26/70; B33Y 10/00; B33Y 30/00;
(Continued)

(56) References Cited

U.S. PATENT DOCUMENTS 6,215,093 B1 * 4/2001 Meiners .................. B22F 12/70
219/121.84
7,847,212 B2 * 12/2010 Renz ...................... B29C 64/153
219/121.61
(Continued)

FOREIGN PATENT DOCUMENTS

CN     104050314 A    9/2014
CN     105188993 A   12/2015
(Continued)

OTHER PUBLICATIONS

Soriano Heras Enrique et al: "Plateauto-level system for fused deposition modelling (FDM) 3D printers", Rapid Prototyping Journal, vol. 23, No. 2, pp. 401-413, XP055547752, GB, ISSN: 1355-2546, DOI:10.1108/RPJ-06-2015-0065, the whole document; 2017.
(Continued)

*Primary Examiner* — Lawrence Averick (57) ABSTRACT

A method for the additive construction of a structure for a component includes the following steps: providing a prefabricated component for the component on a building board, wherein the component has a separating plane, providing a powder bed from a base material for the structure, moving the building board closer to a coating device, aligning a processing surface and the separating plane of the component for preventing adhesion between the component and the coating device, and optically measuring a surface of the powder bed.

11 Claims, 6 Drawing Sheets

(51) Int. Cl.
    *B23K 26/08*     (2014.01)
    *B23K 26/342*     (2014.01)
    *B33Y 30/00*     (2015.01)
    *B33Y 50/02*     (2015.01)
    *B33Y 70/00*     (2020.01)
    *B23K 26/70*     (2014.01)

(52) U.S. Cl.
    CPC .............. *B23K 26/70* (2015.10); *B33Y 10/00* (2014.12); *B33Y 30/00* (2014.12); *B33Y 50/02* (2014.12); *B33Y 70/00* (2014.12)

(58) Field of Classification Search
    CPC ......... B33Y 50/02; B33Y 70/00; B22F 10/20; B22F 10/30; B22F 7/062; B22F 2203/15; B22F 2998/10; B22F 2999/00; Y02P 10/25; G05B 2219/49018; G05B 19/4097
    See application file for complete search history.

(56) References Cited

U.S. PATENT DOCUMENTS

| | | | |
|---|---|---|---|
| 11,084,213 B2 * | 8/2021 | Pieger | .................. G06T 1/0014 |
| 2007/0037509 A1 * | 2/2007 | Renz | ...................... B22F 12/00 454/354 |
| 2014/0263209 A1 | 9/2014 | Burris et al. | |
| 2014/0277669 A1 | 9/2014 | Nardi et al. | |
| 2016/0085944 A1 * | 3/2016 | Brophy | ................... G01W 1/00 702/22 |
| 2017/0052534 A1 | 2/2017 | Ghanem | |
| 2017/0120335 A1 | 5/2017 | Demuth et al. | |
| 2019/0263062 A1 * | 8/2019 | Pieger | ..................... B22F 10/31 |
| 2020/0263978 A1 * | 8/2020 | Pieger | ................. G01B 11/0608 |

FOREIGN PATENT DOCUMENTS

| | | | |
|---|---|---|---|
| DE | 102005025348 A1 | 12/2006 | |
| DE | 102012011217 A1 | 12/2013 | |
| DE | 102013221385 A1 | 4/2015 | |
| DE | 102014014888 A1 | 4/2016 | |
| DE | 102016200303 A1 | 7/2017 | |
| DE | 102016121673 A1 * | 5/2018 | .............. B22F 10/20 |
| DE | 102017219559 A1 * | 5/2019 | ............ B22F 3/1055 |
| EP | 2601006 B1 | 6/2014 | |
| EP | 3012603 A1 | 4/2016 | |
| EP | 3538300 A1 * | 9/2019 | .............. B22F 10/20 |
| EP | 3703890 A1 * | 9/2020 | ............ B22F 3/1055 |
| EP | 3538300 B1 * | 12/2020 | .............. B22F 10/20 |
| WO | 2010043274 A1 | 4/2010 | |
| WO | 2016040453 A1 † | 3/2016 | |

OTHER PUBLICATIONS

PCT International Search Report and Written Opinion dated May 16, 2019 corresponding to PCT/EP2018/081736 filed on Nov. 19, 2018.

\* cited by examiner
† cited by third party

METHOD FOR THE ADDITIVE CONSTRUCTION OF A STRUCTURE AND COMPUTER PROGRAM PRODUCT

CROSS REFERENCE TO RELATED APPLICATIONS

This application is the US National Stage of International Application No. PCT/EP2018/081736 filed 19 Nov. 2018, and claims the benefit thereof. The International Application claims the benefit of German Application No. DE 10 2017 223 223.4 filed 19 Dec. 2017. All of the applications are incorporated by reference herein in their entirety.

FIELD OF INVENTION

The present invention relates to a method for the additive construction of a structure for a component, to a corresponding computer program product, to a measuring device and to a fixing device.

The component is advantageously intended for use in a turbomachine, advantageously in the hot-gas path of a gas turbine. The component advantageously consists of a nickel-based alloy or superalloy, in particular a nickel-based or cobalt-based superalloy. The alloy may be precipitation-hardened or dispersion-hardened.

BACKGROUND OF INVENTION

Generative or additive production methods comprise, for example, as powder bed method selective laser melting (SLM) or laser sintering (SLS), or electron beam melting (EBM).

A selective laser melting method is known, for example, from EP 2 601 006 B1. Additive manufacturing methods have proven particularly advantageous for complex or complicatedly or filigree-designed components, example labyrinth-like structures, cooling structures and/or lightweight structures. In particular, additive manufacture is advantageous because of a particularly short chain of process steps, since a step of production or manufacture of a component can be carried out directly on the basis of a corresponding CAD file.

Furthermore, additive manufacture is particularly advantageous for the development or production of prototypes which cannot be produced, or cannot be produced efficiently, by means of conventional subtractive or machining methods or casting technology.

SUMMARY OF INVENTION

The present invention advantageously relates to a hybrid production method, wherein the structure is constructed on a prefabricated part by means of selective laser melting or electron beam melting. The use advantageously relates to repair or maintenance processes of components, in particular turbine pieces.

In order to use the method of selective laser melting or alternatively electron beam melting for the described uses, accurate orientation between a construction plate, or a prefabricated part fixed thereon, and the structure to be newly applied is necessary since a coater, which conventionally defines a processing plane for the SLM process, has to work within narrow accuracy tolerances of a few micrometers in order to apply new powder on the processing plane (powder bed).

If, for example, the processing plane on which a new powder layer is intended to be applied is not accurately parallel to the coating plane, which is defined by a movement of the coater, this leads to geometrical deviations for the structure to be constructed, or for the entire component. Furthermore, in the event of deficient orientation with respect to the structure to be constructed during the post-processing or additive construction steps, the construction plate cannot be used, or can be used only with difficulty, for referencing of the production process since the risk exists of collisions between the coater, or a coating device, and the (prefabricated) part.

It is therefore an object of the present invention to provide means which allow or simplify the additive construction of a structure on an already prefabricated part. In particular, the means described here allow or simplify accurate orientation between a processing face, or a coating face, and a separating plane of the part.

This object is achieved by the subject matter of the independent patent claims. The dependent patent claims relate to advantageous configurations.

One aspect of the present invention relates to a method for the additive construction of a structure for a component, comprising providing a prefabricated part for the component on a construction plate. The part is advantageously fixed on the construction plate. The part advantageously furthermore comprises a separating plane. The separating plane is advantageously a planar face which at the same time is intended to be used for the additive construction of the structure, so that the structure is connected (with a material fit) to the part by means of this plane. The separating face or separating plane is advantageously defined or exposed by a mechanical processing step.

The method furthermore comprises providing a powder bed consisting of a base material for the structure.

The method furthermore comprises approaching the construction plate to a coating device or a coater.

The method furthermore comprises orientating the processing face, processing plane or coating face and the separating plane of the part in order to prevent a collision between the part and the coating device.

The method furthermore comprises optically measuring a surface of the powder bed, for example by means of a structured-light scanner.

In one configuration, the surface is measured during the coating of the processing face with the base material by the coating device. By this configuration, the process of the optical measurement may be carried out time-efficiently and in parallel with the coating process.

In one configuration, the surface is measured by the coating device during a return movement thereof. By this configuration, the process of the optical measurement may likewise be carried out time-efficiently and in parallel with the coating process.

In one configuration, the surface is optically measured layer-by-layer during the additive construction, advantageously substantially before or after each irradiated or solidified layer. By this configuration, the entire construction process of the structure may advantageously be monitored, and furthermore collisions of the coating device and damage to the entire additive production system may be prevented. Furthermore, a 3D model of the part and/or of the structure is compiled and—for example as a digital twin—used for further additive construction or repair methods.

In one configuration, an angle between the processing face and the separating plane is determined for the orientation.

In one configuration, the angle is determined by the optical measurement of a portion, for example protruding from the processing face, of the part. This configuration expediently makes it possible to determine the angle between the processing face/coating face and the separating plane.

In one configuration, the approaching of the construction plate to the coating device is carried out by means of a photoelectric barrier.

In one configuration, the construction plate is raised stepwise for the approaching thereof until said photoelectric barrier is broken. By this configuration, the approaching may be carried out particularly expediently and advantageously.

In one configuration, a code in the separating plane of the part is optically identified or read during the measurement, the code containing information about a geometry and/or an orientation of the part. By this configuration, an apparatus, measuring device or hardware which is adapted for optical measurement of the surface of the powder bed may simultaneously contribute to automation of the additive production method and, for example, read the code into a corresponding data processing device.

In one configuration, the construction plate is nonplanar and the processing face is defined as a result of a best-fit calculation. This configuration advantageously makes it possible to employ construction plates already used beforehand, which for example need not necessarily be planarized by elaborate mechanical processing, in particular milling, erosion or high-precision grinding, for a further additive construction process. By the approaching of the construction plate to the coating device of the described method, nonplanarities of the construction plate may be taken into account and, for example, despite the nonplanar processing face of the construction plate, a collision thereof with the coating device may be prevented.

A further aspect of the present invention relates to a method for the additive construction of a structure for a component, comprising fixing a prefabricated part for the component in a fixing device in such a way that a separating plane of the part is orientated parallel to a reference surface of a carrier guided in the fixing device, for example a clamping face of a die or plunger as the carrier.

The method furthermore comprises recording an angle between the processing face, or coating face, and the separating plane.

The method furthermore comprises providing a powder bed consisting of a base material for the structure.

The method furthermore comprises additively constructing the structure on the processing face, in order to orientate the processing face, in particular relative to the separating plane of the part, the angle being recorded either by a measurement or by reading a code (see above) and being taken into account for the additive construction.

This method may—in respect of the orientation of the processing face and the separating plane of the part—represent an alternative solution to the method described further above.

By the described methods for the additive construction of the structure, in particular crucial advantages are introduced for automation or standardization of additive production methods. In addition or as an alternative, the reliability, efficiency and quality of the described processes, in particular powder bed-based additive production processes, and of the correspondingly produced components, may therefore be improved.

In the course of the industrial transition to closer and closer networks between companies and customers ("Internet of Things"), the described methods may furthermore be used increasingly to automate additive production methods, and/or to certify the correspondingly produced components and to automate corresponding data acquisition, and therefore to provide "digital twins" of the components.

In one configuration, the carrier is standardized and is provided with a machine-readable code, the code being readable by the device.

In one configuration, the fixing device is transparent on the side facing away from the carrier. This advantageously allows optical measurement of said angle (contact angle) by means of a camera.

In one configuration, the part is fixed in the fixing device by a filler material, in particular a transparent filler material. In addition to measurability of the angle, for example by said measuring device, this configuration allows expedient fixing of the component.

In one configuration, the angle is measured by means of a camera, by the carrier being rotated, advantageously through 360°, and furthermore the smallest angle between the part and the camera being stored.

A further aspect of the present invention relates to a computer-readable medium, computer program or computer program product comprising instructions which, when the program is executed by a computer or a data processing device, cause the latter to read information about the relative position of the separating plane of the part, i.e. relative for example to the processing face, into the computer and, by means of a CAM method, to newly carry out layer subdivision (slicing) of the structure and/or establishment of irradiation parameters, in particular irradiation vectors.

A further aspect of the present invention relates to a measuring device which is coupled to a coating device for coating a processing face for the additive construction, wherein the measuring device is furthermore configured for layer-by-layer optical measurement of the surface as described above.

A further aspect of the present invention relates to a device or fixing device (as described above) comprising a carrier and a guide configured for linear guiding of the carrier, wherein the carrier is standardized and is provided with a machine-readable code, for example a QR code and/or an RFID code.

Configurations, features and/or advantages which relate here to the method/methods may furthermore relate to the computer program/computer program product, the measuring device and/or the fixing device, or vice versa.

BRIEF DESCRIPTION OF THE DRAWINGS

Further details of the invention will be described below with the aid of the figures.

DETAILED DESCRIPTION OF INVENTION

In the exemplary embodiments and figures, elements which are the same or have the same effect may respectively be provided with the same references. The elements represented and the size proportions of the elements represented in the figures with respect to one another are not in principle to be regarded as true to scale; rather, individual elements may be represented exaggeratedly thick or largely dimensioned for better representability and/or for better comprehensibility.

Figure 1:
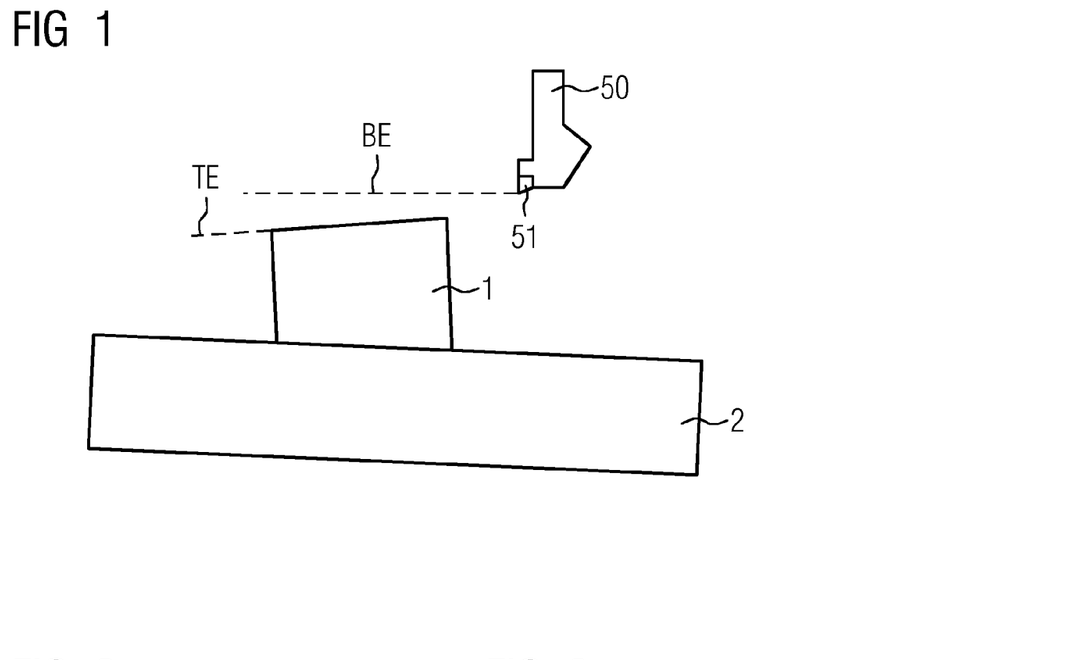
FIG. 1 shows a schematic sectional or side view of a prefabricated component and a portion of a coating device.

FIG. 1 shows a schematic sectional or side view of a construction plate 2, on which a part 1 is arranged. The construction plate 2 comprises a planar surface (not explicitly denoted). The part 1 is arranged, for example fixed, on the surface. Advantageously, the part 1 has been arranged on the construction plate 2 in order to be further constructed by a powder bed-based method, in particular selective laser melting or electron beam melting, or has in this way been provided with a structure (cf. reference 10 in the following figures).

In an alternative configuration, the construction plate 2 comprises a nonplanar surface, for example a surface which has not been high-precision ground or processed in another way, so that the orientation of the part, insofar as it is arranged on the construction plate 2, with a known geometry of the part 1, is not uniquely established relative to the construction plate.

The part 1 comprises a separating cut, a separating face, or a separating plane TE. The separating plane TE is or has been advantageously exposed by a mechanical processing step, during which for example a worn subregion of a component 100 has been removed.

In most cases, this separating cut TE is not parallel to a base face (not explicitly denoted) of the component 100, or of the part 1, which in the present case directly adjoins the construction plate 2. It can be seen in FIG. 1 that the separating plane TE does not extend parallel to the surface of the construction plate 2. Furthermore, the separating plane is canted, or makes an angle not equal to zero with a processing plane or processing face BE. The processing face BE may, for example, be defined by a coater or a coating device 50.

The coating device 50 furthermore comprises a blade 51, which is advantageously moved in the X and/or Y direction over a powder bed (cf. P in the following figures) in order to apply a new layer of powder or base material for the construction of the structure 10.

If, for example, a portion of the part 1 protrudes beyond the processing plane indicated by the dashed line, i.e. for example from the powder bed, there is a threat of collision of said subregion with the blade 51, which is for example being moved or guided from right to left along the processing plane BE for the additive construction of the structure (coating).

Figure 2:
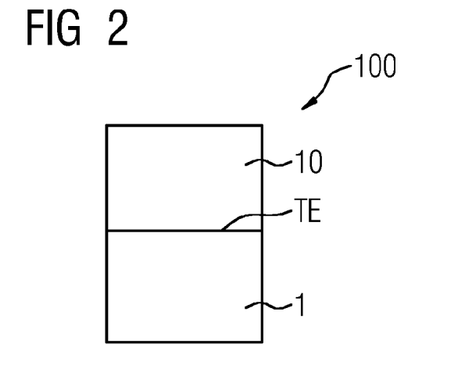
FIG. 2 shows a schematic sectional or side view of a structure constructed on a prefabricated part.

FIG. 2 shows a setpoint geometry of the component 100 in a side or sectional view. The structure 10 has been constructed, i.e. metallurgically connected to the part 1 by means of the separating plane TE, on the component 1, advantageously by an additive powder bed-based method (SLM or EBM). FIG. 2 advantageously shows a correct orientation of the structure 10 on the part 1.

Figure 3:
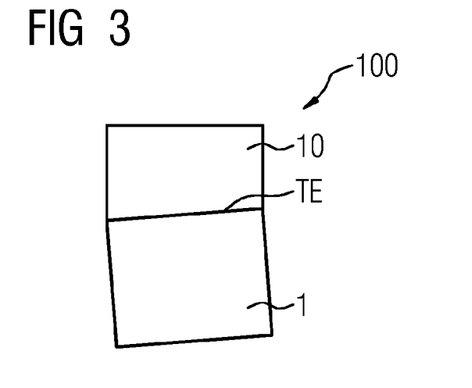
FIG. 3 shows an alternative schematic sectional or side view of a structure constructed on a prefabricated part.

FIG. 3 shows a geometry or a construction of the component 100 in the event of deficient orientation (actual geometry). In the case of the component 100 of FIG. 3, for example, the constructed structure 10 is likewise connected to the part 1 by means of the separating plane TE, although in contrast to FIG. 2 the construction has been carried out in such a way that the applied layers do not extend parallel to the separating plane TE. In other words, a possible processing plane BE is not been orientated parallel to the separating plane TE.

Figure 4:
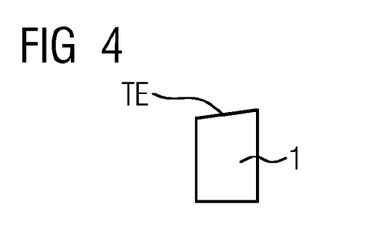
FIG. 4 shows a schematic sectional or side view of a prefabricated part.

FIG. 4 shows a schematic sectional or side view of the part 1, the separating plane TE (in a similar way to the representation of FIG. 1) being orientated at an angle not equal to 0 and 90° with respect to the other surfaces of the part 1.

Figure 5:
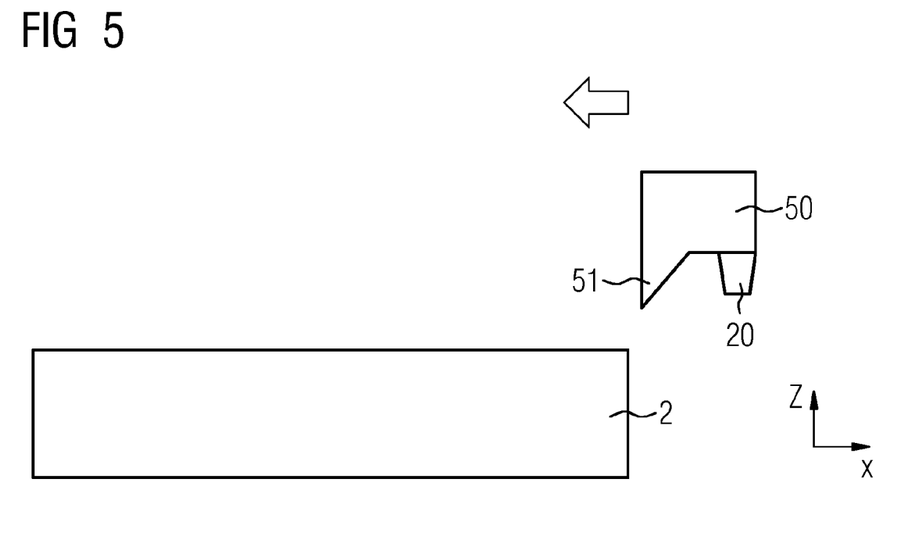
FIG. 5 shows a schematic sectional or side view of a measuring device.

In a similar way to the representation of FIG. 1, FIG. 5 shows a construction plate 2 and the coating device 50 according to the invention, for example implemented in an additive manufacturing device (not explicitly denoted). The coating device 50 furthermore comprises a measuring device 20. As an alternative, the measuring device 20 may be coupled to the coating device 50, the measuring device 20 furthermore being configured for layer-by-layer optical measurement of the surface of the construction plate, or of a powder bed arranged on the construction plate 2. The measuring device 20 may for example furthermore comprise a structured-light scanner, a line scanner, an infrared scanner and/or a thermography instrument or similar means, for example for measuring the layer quality or construction quality. The measuring device 20, or said scanner, is advantageously configured to determine nonplanarities and/or a topology of the powder bed and of the regions melted by an irradiation device, a laser or an electron beam. In particular, a topology of the powder bed (not explicitly denoted here) may be recorded during a coating process (the corresponding movement is indicated by the arrow directed leftward in FIG. 5), and a topology of the corresponding remelted and/or solidified powder or base material may be determined during a return movement (movement from left to right). By this configuration, information of each individual layer of the structure 10 for the component 100 (cf. FIGS. 2 and 3) may be determined and stored, in which case early detection of structural faults, shrinkage or distortions, unmelted regions, foreign bodies, defects or steps may at the same time be detected.

The coating device 50 may furthermore comprise a photoelectric barrier (not explicitly denoted), with the aid of which the construction plate (in a corresponding production system) may be approached to the coating device or the processing plane. In particular, the construction plate 2 may be raised stepwise upward to the processing plane BE in the course of said approaching until a corresponding photoelectric barrier, which in FIG. 5 is set up for example in the vicinity of the blade 51, is broken.

For the automated orientation of the construction plate 1, a collision must be avoided during the first "coater run". Said photoelectric barrier can ensure that a certain distance, for example 10 mm, between the coater plane BE and the construction plate 2 is not fallen below. As an alternative or in addition, a plurality of photoelectric barriers may be set up for X and Y directions. The construction plate 2 is raised automatically until the signal of the photoelectric barrier stops the movement. If the photoelectric barrier is broken after the installation of the plate, it is automatically lowered until the distance is established and the signal stops the movement again.

The angle is subsequently determined in a first run.

By rotation about X and Y axes, the construction plate may be orientated parallel to the processing plane BE. A second "coater run" (return movement) may furthermore check the orientation.

Figure 6:
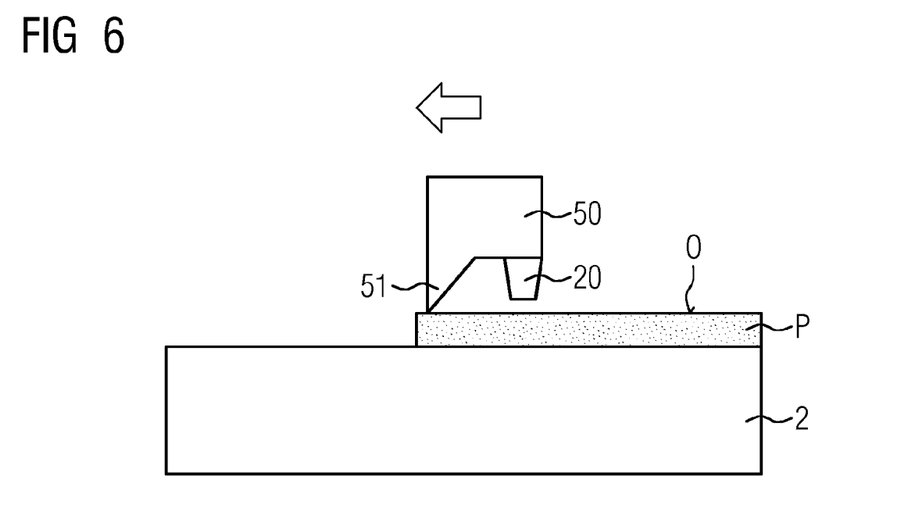
FIG. 6 shows an alternative schematic sectional or side view to FIG. 5 of a measuring device.

FIG. 6 shows a situation in which a powder bed P having a corresponding surface O is indicated on the surface of the construction plate 2. The surface O is, for example, optically measured actually during a coating operation by the measuring device 20. This may be done at or for each layer or for every second layer (cf. reference 11 in the following figures) by the measuring device 20.

During the optical measurement of the surface of the powder bed P, a code in the separating plane TE of the part 1 may for example be optically detected, the code containing information about a geometry and/or orientation of the part 1. As an alternative or in addition, this information may be taken into account a priori in order to prevent a collision between a portion of the part or structure 10 and the coating device 50, in particular the blade 51.

Figure 7:
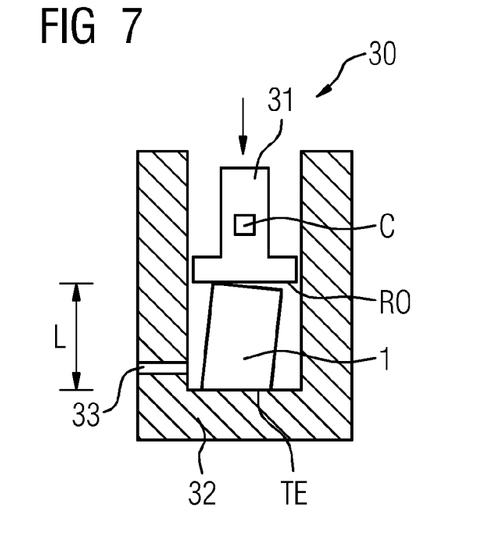
FIG. 7 shows a schematic sectional or side view of a device which comprises a carrier in which a part is fixed.

FIG. 7 indicates a further aspect of the present invention. In particular, a fixing device or device 30 is shown, with which to improve the orientation, for example of a structure to be applied on a component or a prefabricated part. In other words, the orientation of the separating plane TE and the processing face BE, or of the coating plane, may be simplified and/or automated, as described above.

The measuring device 30 comprises a carrier 31. The measuring device 30 furthermore comprises a guide 32. The carrier 31 is advantageously arranged movably in the guide along a particular direction (here the vertical direction). The part 1 is furthermore arranged in the guide 32 so that the separating plane TE of the part 1 is advantageously orientated parallel to a reference surface RO of the carrier 31. The separating plane TE of the part 1 advantageously corresponds here to the lower face of the part 1, i.e. the opposite side from the carrier (cf. FIG. 7). The carrier 31 fixes or clamps the part 1 advantageously at least partially in the guide 32.

The carrier 31 may furthermore be standardized. The carrier 31 is advantageously furthermore provided with a machine-readable code C, for example a QR code and/or an RFID code. Expediently, said code C may be read by means of corresponding means of the device 20, so that the carrier 31 can be identified.

In one configuration, the device 30 may furthermore have a transparent bottom 34 or a transparent structure on the side facing away from the carrier 31. This bottom may, for example, consist of glass or acrylic glass or comprise these materials. The bottom 34 advantageously furthermore makes it possible to automatically read a code introduced into the separating cut TE (see above), for example by means of integrated illumination. This information may for example be assigned to said code of the carrier 31 and be read, in particular when an orientation and position of the carrier in the device 30 or the orientation angle (see above) is known, and this information is contained in the code.

Figure 8:
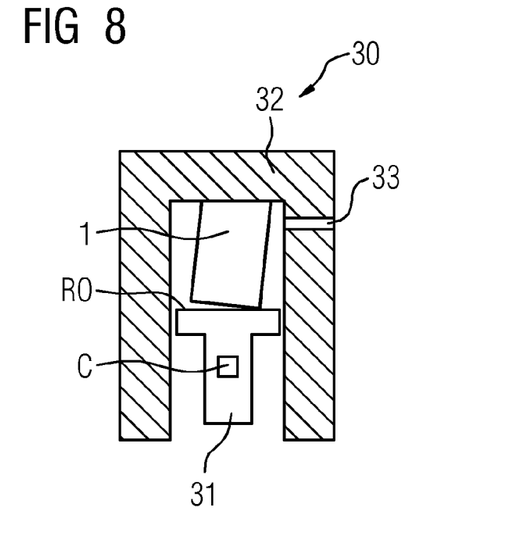
FIG. 8 shows a device rotated through 180° in comparison with FIG. 7.

FIG. 8 shows a configuration in which the device 30 has been rotated through 180° relative to FIG. 7.

Figure 9:
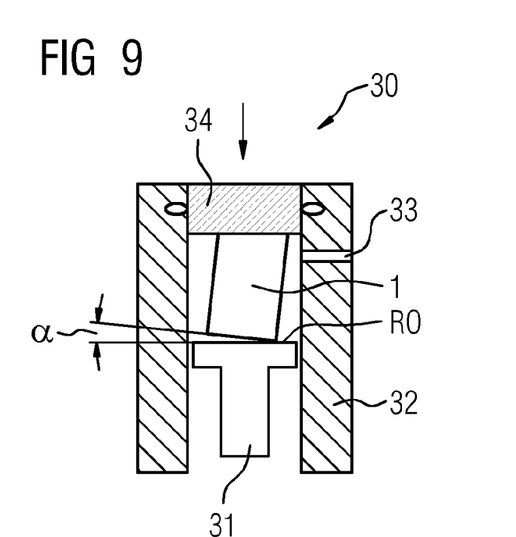
FIG. 9 shows an alternative configuration of the device to FIG. 8.

FIG. 9 shows a further configuration. According to this configuration, a filler material 37 may be introduced into the device 30 through an opening 33 in order to fix the part 1. The filler material 37 is advantageously introduced into the device 30 in order to embed the component.

Figure 10:
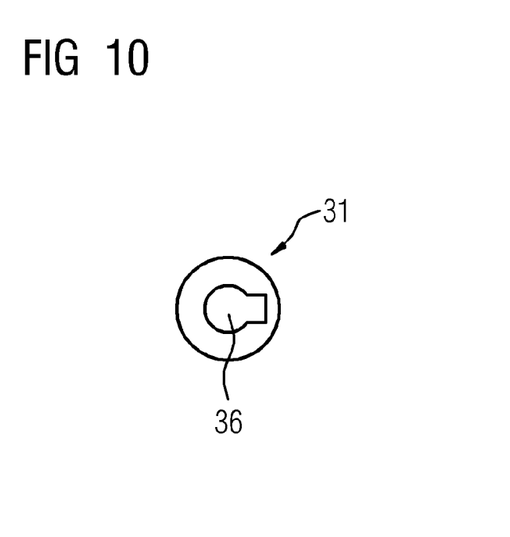
FIG. 10 shows a schematic view of the carrier of FIGS. 7 to 9 in an exemplary configuration.

FIG. 10 shows a plan view or sectional view of the carrier 31, which is indicated with an inner face 36. By means of the inner face 36, which corresponds for example to an asymmetrical surface, or a surface deviating from a cylindrical shape, a rotational movement of the carrier 31 may for example be carried out in a simplified manner.

Figure 11:
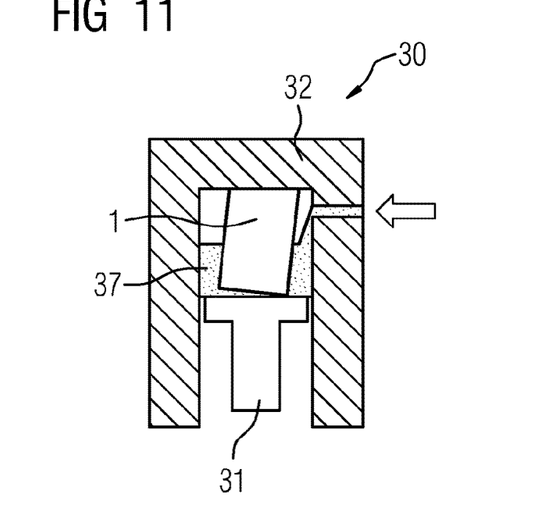
FIG. 11 indicates method steps of a method according to the invention with the aid of the device.

Introduction of the filler material 37 into the guide 32 is furthermore indicated in FIG. 11 by the arrow next to the opening 33.

Figure 12:
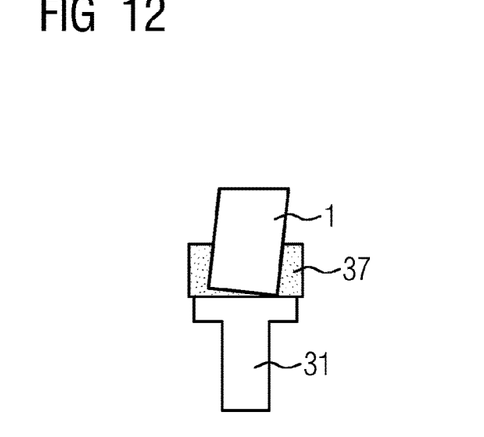
FIGS. 12 to 17 indicate further portions of a method according to the invention.

After curing of the filler material 37, for example, the carrier 31 and the component, or the part 1, may be removed from the guide 32, which is indicated with the aid of FIG. 12, in which the guide 32 is not represented.

The filler material 37 may furthermore be an epoxy resin. As an alternative, it may comprise a material which, for example, can be selectively removed again by means of a chemical reaction.

Figure 13:
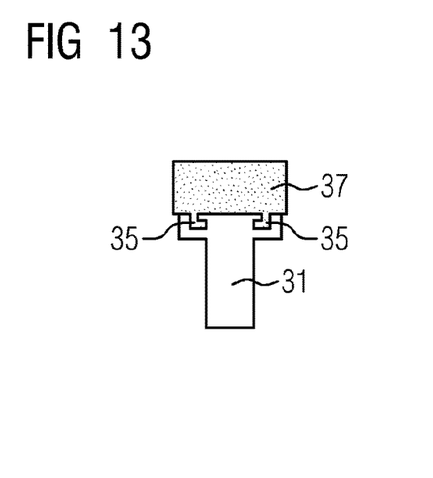

FIG. 13 shows, in an alternative configuration, that the part 1 may furthermore be connected to the carrier 31 by means of interlocking, or hooks 35.

Through the transparent bottom 34, it is furthermore possible to record an angle α between the reference surface RO and a surface, adjacent thereto, of the part 1, advantageously in an optical manner.

Said angle α may, for further additive construction of a structure on the part 1, correspond to an angle between the separating plane TE and a processing face (see above).

Figure 14:
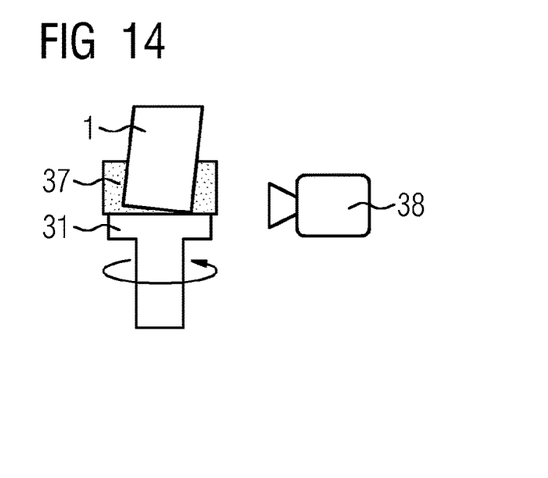

The angle α may, as represented by way of example with the aid of FIG. 14, be recorded in an optical manner, in particular by means of a camera 38. The curved arrow in FIG. 14 indicates that the carrier 31 is rotated, advantageously through 360°, during the measurement of the angle α, that angle α which corresponds to the smallest contact area (cf. the circle in FIG. 16) furthermore being measured and stored.

By the height measurement of a length L (see FIG. 17), the rotation angle and the angle α with respect to the contact area, the position of the separating cut TE is determined and may be stored automatically in the system.

Figure 15:
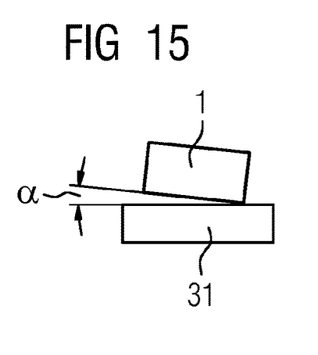

FIG. 15 shows the angle α between the carrier 31 and the part 1.

Figure 16:
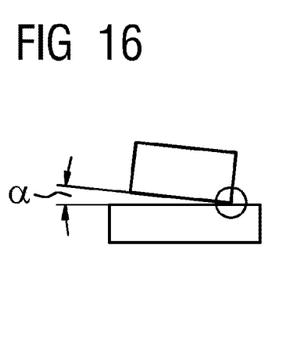

FIG. 16 indicates a contact area (cf. circle) between the carrier 31 and the part 1.

Figure 17:
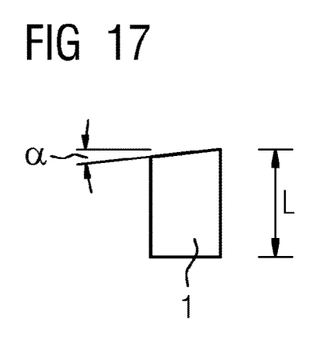

FIG. 17 furthermore denotes the angle α and a vertical length L of the part 1.

Figure 18:
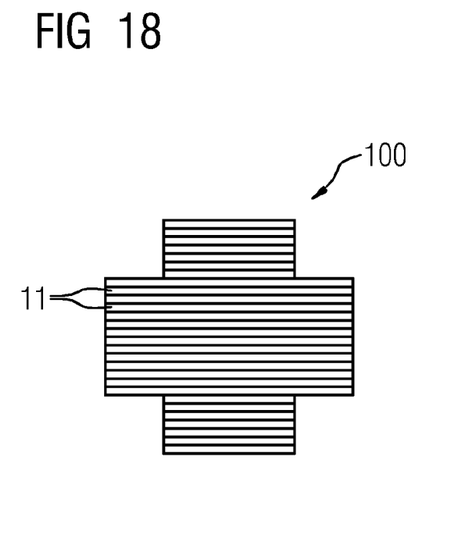
FIG. 18 indicates at least one portion of a CAM method as a portion of an additive process chain.

FIG. 18 shows a schematic view of a component 100 which is composed of a multiplicity of layers 11.

Figure 19:
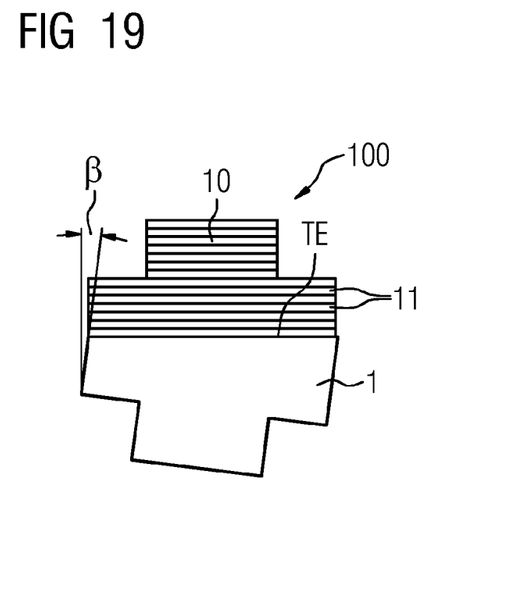
FIGS. 19 to 21 indicate similar method steps to FIG. 18 of a method according to the invention.

FIG. 19 shows a schematic sectional or side view of the component 100, or a model of the component.

The model may at least partially represent a CAD file or a CAM file. The lower portion of the component shown is denoted as filled out, which is intended to indicate the part 1 described above. The upper part of the component 100 is indicated as lined, i.e. consisting of individual layers 11, which is intended to illustrate a CAM method for the additive production, for example comprising so-called "slicing". It may furthermore be seen that the transitions from the lower portion to the upper portion and/or side walls of the component 100 are not straight, but rather the lower portion (part) and the upper portion (construction) constructed and/or modeled thereon are not orientated correctly (cf. FIG. 3). FIG. 19 furthermore shows an angle β that indicates the deficient orientation between the part 1 and the additive construction, or the structure 10, or corresponding main symmetry axes. The angle β may for example be at most 3°, 5°, 10° more or less.

Said angle β may for example be proposed, defined and/or stored in software, a computer program or computer program product.

Advantageously, by a method according to the invention, starting from an angle β greater than or greater than or equal to 3° (or 5°, 10° or more)—for example in the course of a CAM (computer aided manufacturing) method—layer subdivision for the component 100 (cf. FIG. 18), in particular "slicing", and recalculation of irradiation vectors is carried out in an automated manner. This is advantageously done in such a way that a component quality, in particular a structural quality, defect density, hot crack resistance, is not influenced, which could otherwise be the case with significantly overhanging regions of the component.

If, for example, the position of the separating cut TE is known and, for example, stored in a process control and documentation system, this information may be used in order to generate CAM files. As an alternative, a 3D measurement (scan) of the component 100 may be carried out and the separating cut or its position may be output as an element. This element may furthermore be marked as a construction face for the SLM process. From the information about the construction face (separating cut) and the setpoint geometry of the final component, the CAM files for the additive (SLM) construction may be generated individually. By means of the inclination and rotation angles of the part, the component 100 is advantageously newly "sliced", or subdivided into layers (see above). By means of the position of the separating cut TE, the layer starting from which the additive construction of the structure 10 is intended to be carried out may furthermore be determined.

With the described method, in the last step the X-Y position (lateral position in a construction space) and the angle determined according to the means described above may be received in the CAM method for the construction. The required information may, for example, be stored beforehand in a database.

In particular, the described method, which may be implemented in a computer program and the results of which may be described by a computer program product, may comprise instructions that cause a computer to read information about the relative position of the separating plane TE of the part 1 into the computer or the data processing device (not explicitly denoted) and to newly carry out layer subdivision 11 of the structure 10 and/or establishment of irradiation parameters by means of a CAM method.

Figure 20:
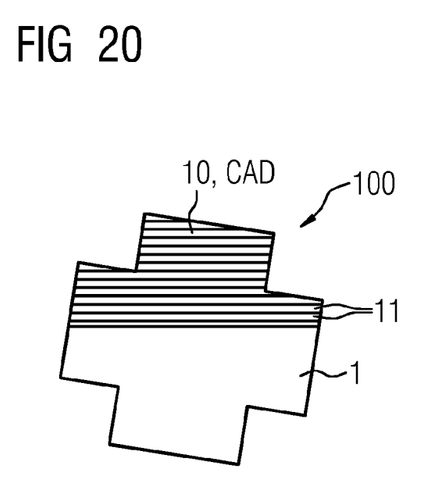

In FIG. 20, particularly in contrast to FIG. 19, it may be seen that the component 100, or a CAD model thereof, which is represented here without restriction of generality or geometrical freedom of the component 100 as similar to a cross, comprises straight side faces. The layer subdivision, shown in FIG. 20, of the layers 11 is advantageously, in relation to an outer contour of the structure 10, different to that of FIG. 19. According to the described method, the layer subdivision has thus been newly defined (see above).

Figure 21:
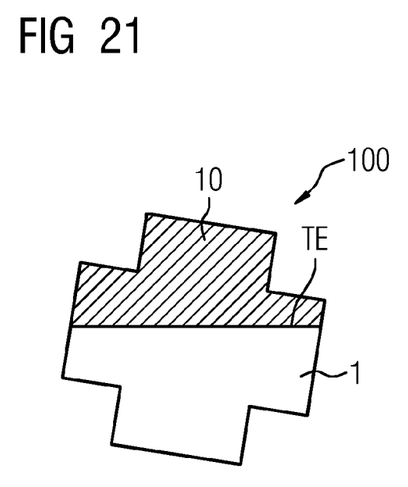

In contrast to FIG. 19, FIG. 21 shows an orientation according to the invention between the part 1 and the structure 10 (setpoint geometry). The component 100 which is shown in FIG. 20 has advantageously also been additively constructed with the aid of the processes described here (after modeling or CAD design). As described above, the component 100 comprises the part 1 and the (additively constructed) structure 10. The upper section of the structure is denoted by different hatching than the lower region. It may furthermore be seen that the described angle β equals 0. In other words, the orientation—in comparison with that which is indicated in FIG. 19—is carried out optimally.

The present methods according to the invention, which in particular represent alternative solutions for the recording of an angle (see above), are intended in particular for additive construction of the structure 10 for the component 100 and may comprise the following steps/features (cf. FIG. 22): —a) providing the prefabricated part 1 for the component 100 on a construction plate 2, the part 1 comprising a separating plane TE, —b) providing a powder bed P consisting of a base material for the structure 10, —c) approaching the construction plate 2 to a coating device 50, —d) orientating a processing face BE and the separating plane TE of the part 1 in order to prevent a collision between the part 1 and the coating device 50, and—e) optically measuring a surface O of the powder bed.

Figure 22:
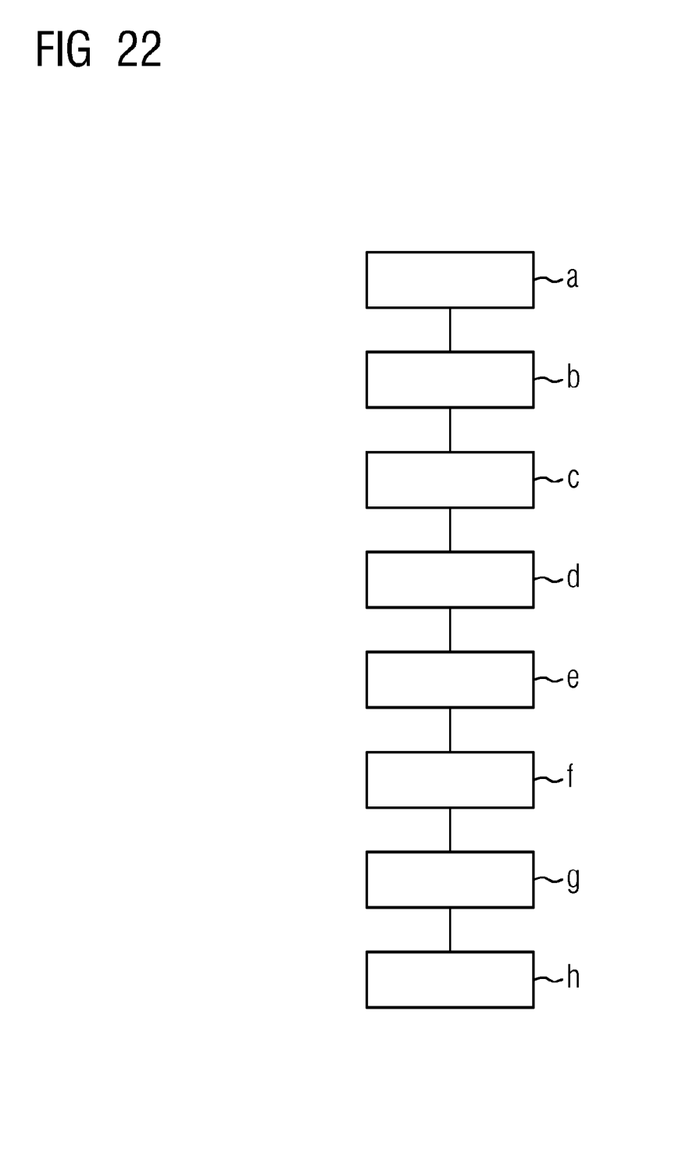
FIG. 22 indicates a method according to and embodiment of the invention.

The following method steps may furthermore be comprised: —f) fixing a prefabricated part 1 for the component 100 in a fixing device 30 in such a way that a separating plane TE of the part 1 is orientated parallel to a reference surface RO of a carrier 31 guided in the fixing device 10, —g) recording an angle α between a processing face BE and the separating plane TE, and—h) additively constructing the structure 10 on the processing face BE, in order to orientate the processing face BE, in particular relative to the separating plane TE of the part 1, the angle α being recorded either by a measurement or by reading a code C and being taken into account for the additive construction.

The description with the aid of the exemplary embodiments does not restrict the invention to these exemplary embodiments; rather, the invention comprises any new feature and any combination of features. This includes in particular any combination of features in the patent claims, even if this feature or this combination per se is not explicitly indicated in the patent claims or exemplary embodiments.

The invention claimed is:

1. A method for the additive construction of a structure for a component, the method comprising:
    providing a prefabricated part for the component on a construction plate, the part comprising a separating plane,
    providing a powder bed consisting of a base material for the structure,
    approaching the construction plate to a coating device,
    orientating a processing face and the separating plane of the part in order to prevent a collision between the part and the coating device, and
    optically measuring a surface of the powder bed,
    wherein the surface is measured during the coating of the processing face with the base material by the coating device.

2. The method as claimed in claim 1, wherein the surface is optically measured layer-by-layer during the additive construction of the structure.

3. The method as claimed in claim 1, wherein an angle (α) between the processing face and the separating plane is determined for the orientation.

4. The method as claimed in claim 3, wherein the angle is determined by the optical measurement of a portion, protruding from the processing face, of the part.

5. The method as claimed in claim 1, wherein the approaching of the construction plate is carried out by a photoelectric barrier, and the construction plate is raised stepwise until the photoelectric barrier is broken.

6. The method as claimed in claim 1, wherein a code in the separating plane of the part is optically identified during the measurement, and wherein the code contains information about a geometry and/or an orientation of the part.

7. The method as claimed in claim 1, wherein the construction plate is nonplanar and the processing face is defined as a result of a best-fit calculation.

8. A method for the additive construction of a structure for a component, the method comprising:
   fixing a prefabricated part for the component in a fixing device in such a way that a separating plane of the part is orientated parallel to a reference surface of a carrier guided in the fixing device,
   recording an angle ($\alpha$) between a processing face and the separating plane, and
   providing a powder bed consisting of a base material for the structure,
   additively constructing the structure on the processing face, in order to orientate the processing face, relative to the separating plane of the part, the angle ($\alpha$) being recorded either by a measurement or by reading a code and being taken into account for the additive construction,
   wherein the carrier is standardized and is provided with a machine-readable code, and wherein the code is readable by the device.

9. The method as claimed in claim 8, wherein the fixing device is transparent on the side facing away from the carrier.

10. The method as claimed in claim 8, wherein the part is fixed in the fixing device by a filler material.

11. The method as claimed in claim 8, wherein the angle ($\alpha$) is measured by a camera, by the carrier being rotated through 360° and the smallest angle ($\alpha$) between the part and the camera furthermore being stored.

* * * * *